(12) United States Patent
Liu

(10) Patent No.: US 10,960,953 B2
(45) Date of Patent: Mar. 30, 2021

(54) SCOOTER

(71) Applicant: X.L.T. International Electronics Co., Ltd., Shenzhen (CN)

(72) Inventor: Antang Liu, Shenzhen (CN)

(73) Assignee: X.L.T. INTERNATIONAL ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 16/542,271

(22) Filed: Aug. 15, 2019

(65) Prior Publication Data

US 2019/0367124 A1 Dec. 5, 2019

Related U.S. Application Data

(63) Continuation of application No. PCT/CN2018/109222, filed on Sep. 30, 2018.

(30) Foreign Application Priority Data

| Feb. 5, 2018 | (CN) | 201820210360.8 |
| Aug. 15, 2018 | (CN) | 201821318775.3 |
| Sep. 29, 2018 | (CN) | 201821606742.9 |

(51) Int. Cl.
*B62K 25/04* (2006.01)
*B62K 3/00* (2006.01)

(52) U.S. Cl.
CPC .............. *B62K 25/04* (2013.01); *B62K 3/002* (2013.01); *B62K 2202/00* (2013.01)

(58) Field of Classification Search
CPC .... B62K 25/005; B62K 25/04; B62K 25/041; B62K 3/002; B62K 2202/00
See application file for complete search history.

(56) References Cited

U.S. PATENT DOCUMENTS

| 2,051,762 | A | * | 8/1936 | Vincent | B62K 9/02 |
| | | | | | 280/87.041 |
| 4,152,001 | A | * | 5/1979 | Christianson | A63C 17/01 |
| | | | | | 280/11.28 |
| 4,181,316 | A | * | 1/1980 | Brand | A63C 17/01 |
| | | | | | 280/11.207 |
| 4,398,735 | A | * | 8/1983 | Evans | A63C 17/01 |
| | | | | | 280/11.28 |
| 5,826,895 | A | * | 10/1998 | Bradfield | A63C 17/01 |
| | | | | | 280/87.042 |
| 6,406,042 | B1 | * | 6/2002 | Tsai | B62K 3/002 |
| | | | | | 280/284 |
| 6,409,190 | B1 | * | 6/2002 | Tsai | B62K 3/002 |
| | | | | | 280/270 |

(Continued)

FOREIGN PATENT DOCUMENTS

CN 204021101 * 12/2014

*Primary Examiner* — Ruth Ilan
*Assistant Examiner* — Maurice L Williams

(57) ABSTRACT

A vehicle includes a front wheel assembly, a handle assembly, a frame assembly and a rear wheel assembly, the front wheel assembly is connected to the handle assembly, one end of the frame assembly is connected to the handle assembly, the other end of the frame assembly is connected to the rear wheel assembly, the front wheel assembly is provided with a shock-absorbing device, and/or the rear wheel assembly is provided with a shock-absorbing assembly to reduce the vibration of the vehicle.

13 Claims, 16 Drawing Sheets

(56) References Cited

U.S. PATENT DOCUMENTS

| | | | |
|---|---|---|---|
| 6,634,661 B1* | 10/2003 | Huang | B62K 3/002 280/276 |
| 2001/0030404 A1* | 10/2001 | Liu | A63C 17/0046 280/87.041 |
| 2002/0005309 A1* | 1/2002 | Patmont | B62M 6/45 180/220 |
| 2002/0079662 A1* | 6/2002 | Lee | B60T 1/04 280/87.041 |
| 2002/0121756 A1* | 9/2002 | Chen | B62K 3/002 280/87.041 |
| 2002/0148663 A1* | 10/2002 | Chang | B62K 3/002 180/210 |
| 2003/0024752 A1* | 2/2003 | Mayer | B62K 3/002 180/220 |
| 2004/0227317 A1* | 11/2004 | Cheng | B62K 3/002 280/87.041 |
| 2006/0061054 A1* | 3/2006 | Grossman | A63C 17/0046 280/87.042 |
| 2011/0233891 A1* | 9/2011 | Prior | A63C 17/12 280/221 |
| 2011/0298194 A1* | 12/2011 | Sanchez | A63C 17/045 280/245 |
| 2013/0300082 A1* | 11/2013 | Swinney | B62K 3/002 280/212 |
| 2013/0320648 A1* | 12/2013 | Eckert | B62K 3/002 280/279 |
| 2014/0076075 A1* | 3/2014 | Miller | F16H 25/14 74/55 |
| 2014/0203531 A1* | 7/2014 | Huang | B60G 3/14 280/124.116 |
| 2015/0035257 A1* | 2/2015 | Zaid | B62K 3/002 280/641 |
| 2015/0321722 A1* | 11/2015 | Dadoosh | B60L 53/14 180/208 |
| 2016/0075397 A1* | 3/2016 | Juan | B62K 25/283 180/220 |
| 2016/0137257 A1* | 5/2016 | Xu | B62K 3/002 280/124.116 |
| 2017/0246528 A1* | 8/2017 | Ma | B62L 1/12 |
| 2017/0320534 A1* | 11/2017 | Grolleau | B62K 15/006 |
| 2018/0086400 A1* | 3/2018 | Cordero | B62K 25/16 |
| 2019/0202519 A1* | 7/2019 | Etzelsberger | B62K 15/00 |

* cited by examiner

125

125

SCOOTER

CROSS-REFERENCE TO RELATED APPLICATIONS

The present application is a continuation of International (PCT) Patent Application No. PCT/CN2018/109222, filed on Sep. 30, 2018, which claims foreign priority of China Patent Application No. 201821606742.9, filed on Sep. 29, 2018, China Patent Application No. 201821318775.3, filed on Aug. 15, 2018, and China Patent Application No. 201820210360.8, filed on Feb. 5, 2018, in the State Intellectual Property Office of China, the contents of all of which are hereby incorporated by reference.

FIELD

The present disclosure relates generally to the field of shock-absorbing device, and in particular, to a vehicle.

BACKGROUND

With the development of modern technology, people began to choose a healthy way of travelling—scooters. In order to make the riders more comfortable, the wheels are equipped with shock absorbers using coil springs.

However, coil springs used in the scooters are less than satisfactory. Even if the coil springs are replaced by leaf springs, the results are still far from satisfactory. Therefore, there is a need for improved shock absorbers used in the scooters.

SUMMARY

In one aspect of the present disclosure, a vehicle is provided that includes a front wheel assembly, a handle assembly, a frame assembly, and a rear wheel assembly, the front wheel assembly is connected to the handle assembly, one end of the frame assembly is connected to the handle assembly, the other end of the frame assembly is connected to the rear wheel assembly, the front wheel assembly is provided with a shock-absorbing device, and/or the rear wheel assembly is provided with a shock-absorbing assembly to reduce the vibration of the vehicle.

In another aspect, the shock-absorbing device is disposed on the front wheel assembly, the front wheel assembly further includes a front fork and a front wheel group, the shock-absorbing device is coupled between the front fork and the front wheel group, the shock-absorbing device is formed with an opening, and the opening is facing or opposite to the rear wheel assembly after the shock-absorbing device is coupled between the front wheel assembly and the front fork.

In another aspect, the shock-absorbing device includes a first damping sheet, a second damping sheet and a stress sheet, the stress sheet is curved and located between the first damping sheet and the second damping sheet for connecting the first damping sheet and the second damping sheet, the direction perpendicular to the first damping sheet is defined as the first direction, two opposite sides of the shock-absorbing device are defined by an axis formed on the junction of the first damping sheet and the stress sheet, the axis is parallel to the first direction, the stress sheet is disposed on one side of the opposite sides, the end of the second damping sheet away from the stress sheet and the first damping sheet are disposed on the other side of the opposite sides, and a gap is defined between the end of the second damping sheet away from the stress sheet and the end of the first damping sheet away from the stress sheet, so that the opening is formed between the first damping sheet and the second damping sheet.

In another aspect, the stress sheet includes a first stress connecting portion and a second stress connecting portion connecting with the first stress connecting portion and the second damping sheet, the first stress connecting portion extends in the first direction away from the second damping sheet to connect the second stress connecting portion and the first damping sheet, a height difference is defined between a first junction where the first stress connecting portion and the first damping sheet meet and a second junction where the first stress connecting portion and the second stress connecting portion meet.

In another aspect, the front fork includes a front fork shaft portion and a damper connecting portion, the front fork shaft portion connects to the handle assembly, and the angle between the horizontal plane and the contacting surface of the first damping sheet and the damper connecting portion is defined as $\alpha$, and $\alpha$ satisfies $0° \leq \alpha \leq 60°$.

In another aspect, the direction of the first damping sheet is defined as a second direction, the second direction is perpendicular to the first direction, the angle between the second direction and the tangent of the first stress connecting portion is defined as $\beta$, and $\beta$ satisfies $90° < \beta \leq 180°$, the second damping sheet is curved and presented as sheet, the angle between the second direction and the tangent direction of any point on the second damping sheet is defined as $\gamma$, and $\gamma$ satisfies $25° < \gamma < 90°$.

In another aspect, the height difference is between 12 mm and 18 mm, the projection length of the first stress connecting portion in the second direction is between 12 mm and 18 mm, and the projection length of the second damping sheet in the second direction is between 70 mm and 120 mm.

In another aspect, the rear wheel assembly is provided with a shock-absorbing assembly, the shock-absorbing assembly includes a damper member, the damper member includes a positioning section, and a damper section and a connecting section, which are sequentially connected, the positioning section is connected to a frame, the connecting section is connected to a wheel assembly, the shortest distance from one end of the damper section to the other end is L, the shortest extension length of the damper section is S, and L to S is between 1:(1.16-2).

In another aspect, the damper section includes a first transition portion, a buffer portion, a second transition portion and a damper portion, which are smoothly connected together and integrally formed, the end of the first transition portion away from the buffer portion is connected to the positioning section, the buffer portion is connected to the frame, the end of the damper section away from the second transition is connected to the connecting section, the first transition portion, the second transition portion, and the damper portion are wavy or curved, and the buffer portion has a planar structure.

In another aspect, the damper section is provided with at least three arched projections, and the openings of two adjacent arched projections are different in direction.

In another aspect, the damper section is provided with at least four arched projections, the openings of two adjacent arched protrusions are facing the same direction.

In another aspect, the length ratio of the buffer portion to the first transition portion to the second transition portion to the damper portion is 1:(2-3.5):(1.2-2):(5.5-7), the angle between the tangent of the first transition portion and the horizontal line is between 0° and 55°, the angle between the tangent of the second transition portion and the horizontal line is between 0° and 50°.

In another aspect, the length ratio of the buffer portion to the positioning portion is 1:(2-6), the length ratio of the second transition portion to the first transition portion to the damper portion is 1:(1-3):(2.8-6).

In another aspect, the arched projections located between two ends of the damper portion are facing the same direction.

In another aspect, the vehicle is a scooter.

The shock-absorbing assembly in the present disclosure has many advantages including the following:

As the opening of the shock-absorbing device is facing or back against the rear wheel assembly for vibration damping, decreasing the damage of the shock-absorbing device, and prolonging the service life of the shock-absorbing device.

By providing the first damping sheet, the second damping sheet, and the stress sheet, and placing the stress sheet between the first damping sheet and the second damping sheet, the end of the second damping sheet away from the stress sheet is disposed on the same side as the end of the first damping sheet away from the stress sheet in the first direction. The gap is defined between the bottom of the second damping sheet away from the stress sheet and the bottom of the first damping sheet away from the end of the stress sheet, and the opening is formed, thus, the stress generated by the deformation of the first damping sheet and the second damping sheet can be eliminated, and the service life of the first damper member is prolonged while vibration damping is achieved.

Because the contacting surface of the first damping sheet and the damper connecting portion is defined as $\alpha$, and $\alpha$ satisfies $0°\leq\alpha\leq60°$, such design is not too large to damage the shock-absorbing device easily, and a better vibration reduction effect is achieved.

The shock-absorbing assembly includes a damper member, which includes a positioning section, a damper section and a connecting section. The ratio of the farthest distance between the end of the positioning section near the damping section and the damping section to the actual length of the damping section is 1:(1.16-2), which has a good damping effect.

The damper section of the shock-absorbing assembly includes the first transition portion, the buffer portion, the second transition portion and the damper portion, which are sequentially smoothly connected and fixedly connected. The smooth connection is beneficial to extend the service life and the strength of the shock-absorbing device, and the first transition portion, the second transition portion, and the damper portion are wavy or curved, which improves the vibration damping effect.

The damping section has at least three arched protrusions, and the opening directions of two adjacent arched protrusions are different, which is favorable for increasing the elasticity of the shock-absorbing device and beneficial for reducing the vibration.

The damper member includes damper sections having at least four arched projections for increasing the elasticity of the damper sections and reducing the vibration of the vehicle.

The angle between the tangent of the first transition portion and the horizontal line is between 0° and 55°, and the angle between the tangent of the second transition portion and the horizontal line is between 0° and 50°. Because the angle is not too large, it not only increases the elasticity of the shock-absorbing device, but also reduces the damage of the shock-absorbing device and extends the service life.

The length ratio of the buffer portion to the positioning portion is 1:(2-6), which is appropriate to relieve the stress and better absorb vibrations. The length ratio of the second transition portion to the first transition portion to the damper portion is 1:(1-3):(2.8-6), which improves the vibration damping effect.

The arched projections having the same opening direction are disposed on two sides of the buffer portion, facilitates connecting the buffer portion to other components of the scooter, and plays an important role in reducing the vibration of the scooter.

BRIEF DESCRIPTION OF THE DRAWINGS

FIG. 4A is an exploded view showing the frame assembly of the.

FIG. 5 is an exploded view showing the rear wheel assembly of the.

DETAILED DESCRIPTION

The disclosure will be described in detail with reference to the accompanying drawings and the specifications. These and/or other aspects and advantages of the disclosure will become apparent and more readily appreciated from the following description of the embodiments, taken in conjunction with the accompanying drawings.

Figure 1:
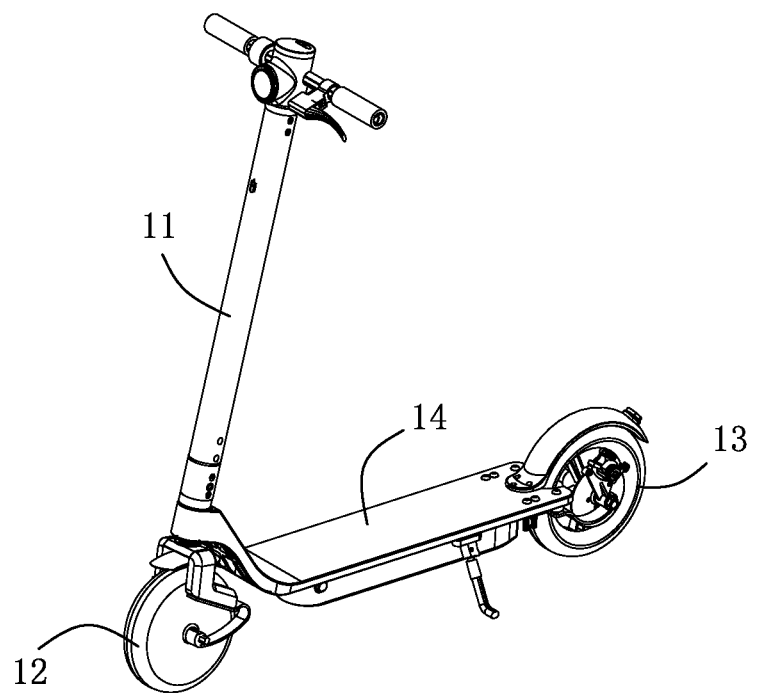
FIG. 1 is a perspective view of one embodiment of the scooter.

Referring generally to FIG. 1, one embodiment of a scooter 10 including a handle assembly 11, a frame assembly 14, a front wheel assembly 12, and a rear wheel assembly 13. The rear wheel assembly 13 is connected to one end of the frame assembly 14, the front wheel assembly 12 is coupled to the handle assembly 11, and rotatable relative to the frame assembly 14, so the scooter can move or slide along the ground while the front wheel assembly 12 is touching the ground. The handle assembly 11 is coupled to the front wheel assembly 12 for driving the front wheel assembly 12 to rotate relative to the frame assembly 14, in order to steer the scooter 10.

Figure 2:
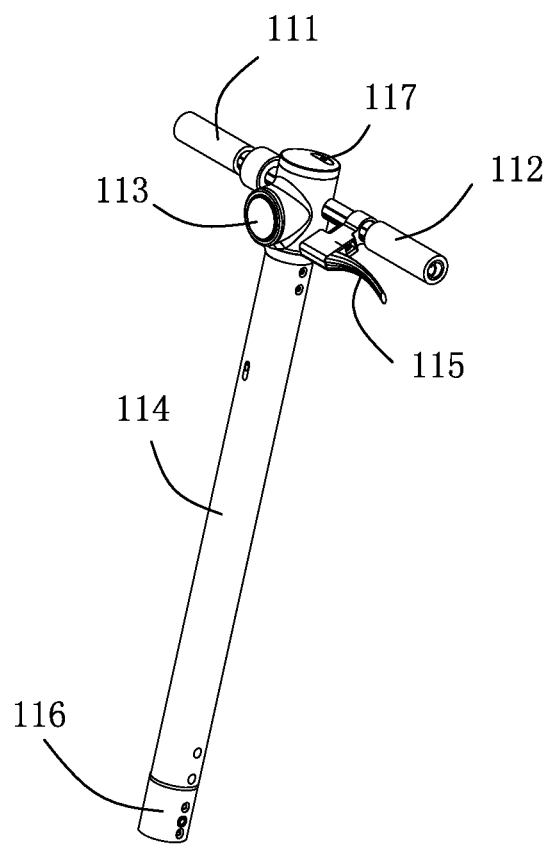
FIG. 2 is a perspective view showing the handle assembly of the scooter.

Referring generally to FIG. 2, the handle assembly includes a first handle 111, a second handle 112, a main body 113, and a connecting rod 114. The first handle 111 and the second handle 112 are respectively connected to two opposite sides of the main body 113, one end of the connecting rod 114 is connected to the main body 113 in the direction perpendicular to the first handle 111 or the second handle 112, and the other end are connected to the front wheel assembly 12. The handle assembly 11 is generally T-shaped after the first handle 111, and the second handle 112 and the connecting rod 114 are coupled to the main body 113, so that the user can hold and rotate the first handle 111 and/or the second handle 112 to steer the scooter 10.

In some embodiments, the handle assembly 11 further includes a hand brake assembly 115 coupled to the first handle 111 or the second handle 112, and braking force can be applied against the front wheel assembly 12 or the rear wheel assembly 13 for braking the scooter 10.

In some embodiments, the handle assembly 11 further includes a control assembly 117 electrically connected with the frame assembly 14 and the front wheel assembly 12, in order to control the power-driven startup, pausing or moving of the scooter 10. The control assembly 117 can be received in the main body 113 and partially exposed to the main body 113, the users can control the activation or ceasing of the scooter 10 by touching or pressing the control assembly 117.

As shown in FIG. 2, in other embodiments, the handle assembly 11 further includes a folding assembly 116. The handle assembly 11 is disposed between the connecting rod 114 and the front wheel assembly 12 for connecting the connecting rod 114 and the front wheel assembly 12, thus, the connecting rod 114 is foldable relative to the front wheel assembly 12.

Figure 3A:
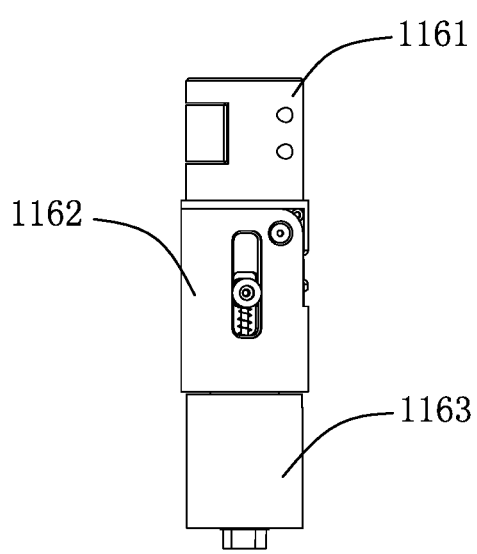
FIG. 3A is a perspective view showing the folding assembly of the scooter
Figure 3B:
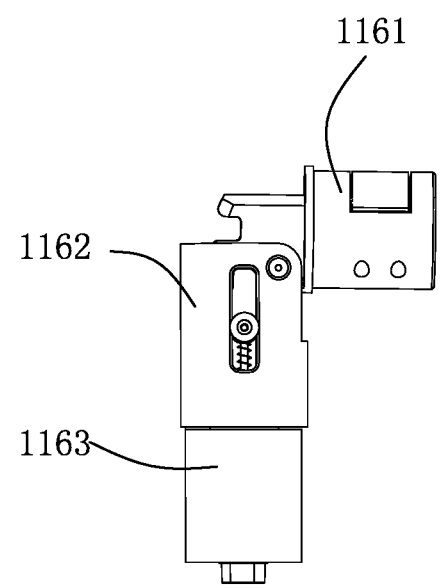
FIG. 3B is a perspective view showing the folding assembly of the scooter in a folded position.

Referring generally to FIGS. 3A and 3B, the folding assembly 116 includes a first connecting portion 1161, a second connecting portion 1162, and a third connecting portion 1163. The first connecting portion 1161 is used for coupling with the connecting rod 114, the third connecting portion 1163 is used for coupling with the front wheel assembly 12, and the second connecting portion 1162 is defined between the first connecting portion 1161 and the third connecting portion 1163, so the scooter 10 can be changed from an expanded position to a folded position for easy storage.

Figure 4A:
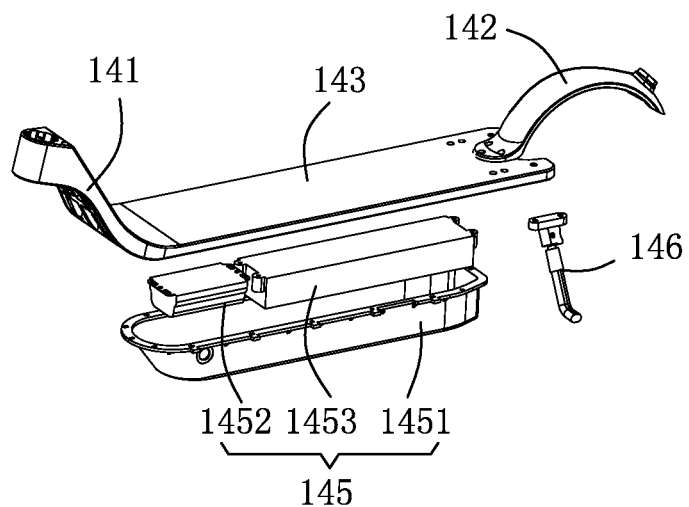
Figure 4B:
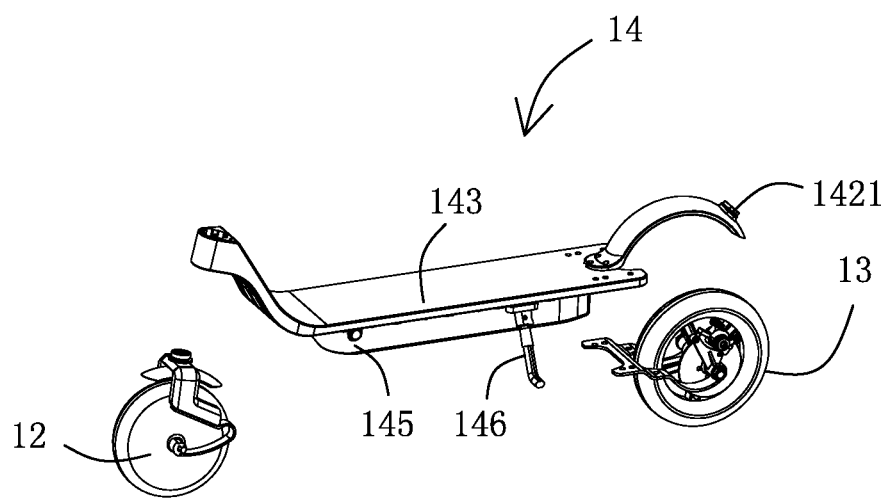
FIG. 4B is a perspective view showing the frame assembly of the scooter in configuration with the front wheel assembly and the rear wheel assembly.
Figure 5:
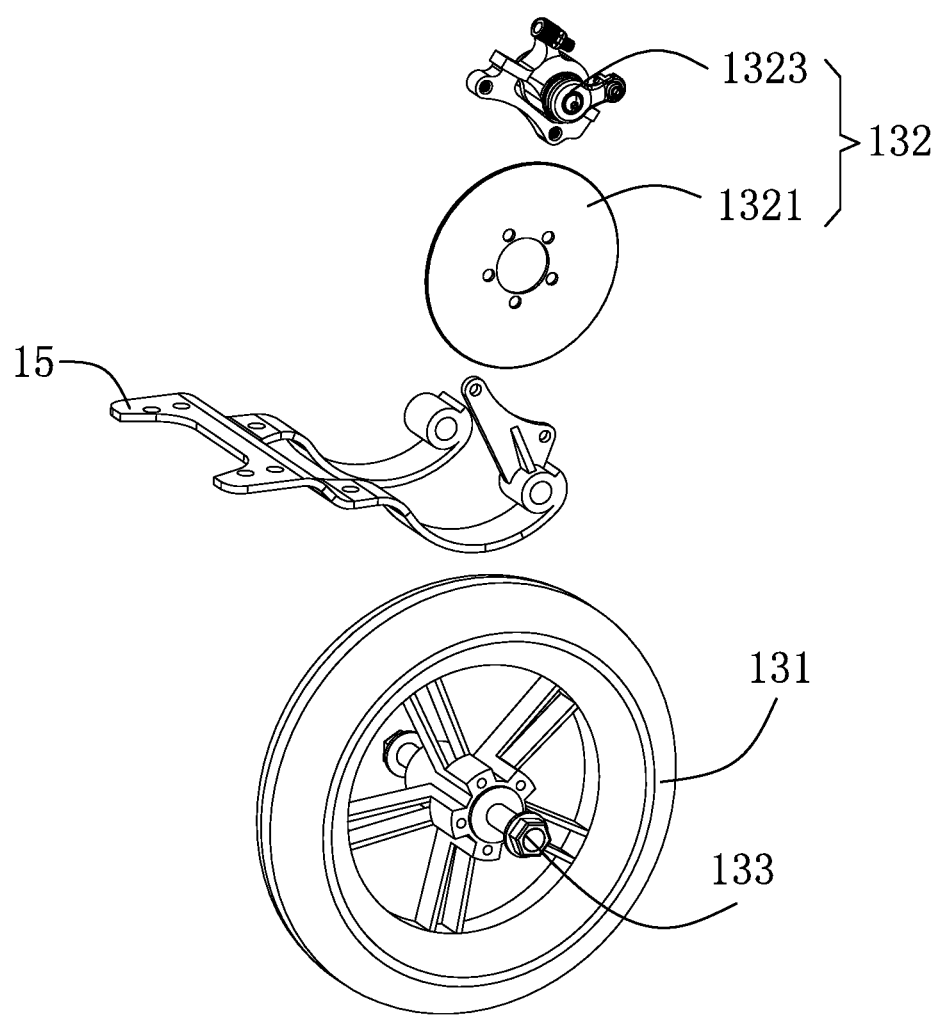

Referring generally to FIGS. 4A and 4B, the frame assembly 14 includes a tube portion 141, a wheel cover 142 and a deck 143. The tube portion 141 is arranged on one end of the deck 143 and sleeved with the folding assembly 116, and the tube portion 141 facilitates the assembly and disassembly of the folding assembly 116 and the frame assembly 14. The wheel cover 142 is arranged on the other end of the deck 143, and the wheel cover 142 is positioned above the rear wheel assembly 13 to act as a fender after the rear wheel assembly 13 is attached to the deck 143.

In other embodiments, the wheel cover 142 is further provided with a foot brake 1421 joined to the wheel cover 142 and is elastically movable relative to the wheel cover 142. When the external force is applied, the foot brake 1421 is in contact with the rear wheel assembly 13 to serve as a brake.

In some embodiments, the frame assembly 14 further includes a kickstand 146 disposed on the bottom of the frame assembly 14. The kickstand 146 is rotatable relative to the frame assembly 14 to achieve the flipping or rotating of the kickstand 146. The user rotates the kickstand 146 when the scooter 10 needs to be parked. The kickstand 146 stands on the ground to provide support for the scooter 10. The kickstand 146 is flipped back while the scooter 10 is being used.

In some embodiments, the frame assembly 14 further includes a storage battery assembly 145 disposed on one side of the deck 143 of the handle assembly 11 for electrically connecting with the control assembly 117. The storage battery assembly 145 is also electrically connected with the front wheel assembly 12 and/or the rear wheel assembly 13 to provide power for the scooter 10.

Specifically, the storage battery assembly 145 includes an outer casing 1452, a controller 1452 and a power source 1453 (e.g., battery). The outer casing 1451 is fixedly connected to the deck 143 and forms a cavity therebetween, the controller 1452 and the power source 1453 are electrically connected and received in the cavity, and the controller 1452 is electrically connected with the control assembly 117 and controls the power supply via the control assembly 117.

Referring to FIG. 2, the rear wheel assembly 13 includes a rear wheel group 131, a brake assembly 132, a hub shaft 133 and a shock-absorbing assembly 15. The hub shaft 133 is rotatably coupled to the rear wheel group 131, and the brake assembly 132 is coupled to the rear wheel group 131 in case of an emergency stop of the rear wheel group 131. Specifically, the brake assembly 132 includes a brake disk 1321 and a clamping assembly 1323. The brake disk 1321 and the rear wheel group 131 are fixed by screws, the clamping assembly 1323 is coupled to the hub shaft 133 or the shock-absorbing assembly 15, and is elastically movable relative to the brake disk 1321 to clamp the brake disk 1321. The hand brake assembly 115 exerts force on the clamping assembly 1323 when braking is required, thereby the clamping assembly 1323 clamps the brake disk 1321, and resistance is added to the rear wheel group 131, which is connected to the brake disk 1321, to urgently stop the rear wheel group 131. The greater the grip force the user applies to the hand brake assembly 115, the better the braking results to stop the rear wheel 131 from rotating. The smaller the grip force the user applies to the hand brake assembly 115, the lesser the braking results.

The shock-absorbing assembly 15 connects the hub shaft 133 and the frame assembly 14 to reduce the vibrations generated by the rear wheel assembly 13 during traveling.

Referring to FIGS. 6A to 6D, the shock-absorbing assembly 15 is a leaf spring structure. The shock-absorbing assembly 15 includes a first damper member 151 and a second damper member 155, the first damper member 151 and the second damper member 155 are connected and separated independently from each other. The first damper member 151 and the second damper member 155 are axis-symmetrical and are integrally formed by die casting. In the present embodiment, the first damper member 151 and the second damper member 155 are described as an axis-symmetric structure.

The first damper member 151 includes a first positioning section 1511, a first damper section 1512 and a first connecting section 1513, which are sequentially connected. The second damper member 151 includes a second positioning section 1551, a second damper section 1552 and a second connecting section 1553, which are sequentially connected.

The first positioning section 1511 and the second positioning section 1551 are respectively connected with the frame assembly 14, the first connecting section 1513 and the second connecting section 1553 are respectively connected with the rear wheel assembly 13. A cutout 152 is defined between the first damper member 151 and the second damper member 151, the shape of the cutout 152 is adapted to that of the rear wheel assembly 13, and the size of the cutout 152 is slightly larger than that of the tire of the rear wheel group 131 so that the rear wheel group 131 is prevented from being scraped by the shock-absorbing assembly 15. As shown, the cutout 152 is U-shaped.

The first positioning section 1511 and the second positioning section 1551 can be fixedly connected to the frame assembly 14 by bolts.

Further, in order to ensure the vibration damping effect of the first damper member 151 and the second damper member 155, the thickness d1 of the first positioning section 1511 and the first damper section 1512 can be between 2 mm and 13 mm, between 3 mm and 10 mm, between 3 mm and 7 mm, or about 4 mm.

The thickness d1 of the second positioning section 1551 and the second damper section 1552 can be between 2 mm and 13 mm, between 3 mm and 10 mm, between 3 and 7 mm, or about 4 mm.

Figure 6A:
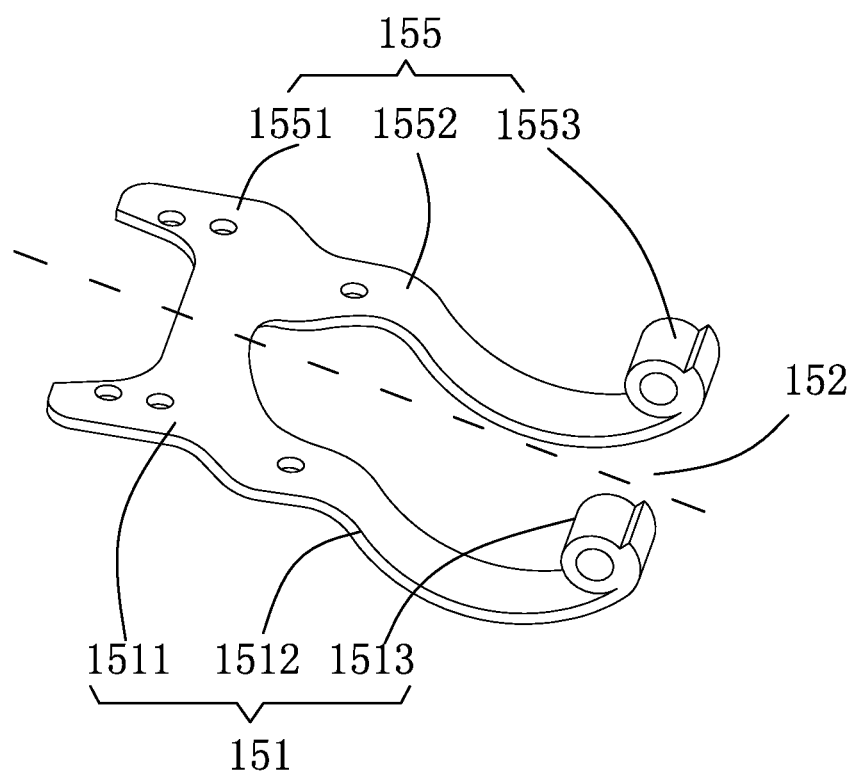
FIG. 6A is a perspective view showing the shock-absorbing assembly of the scooter.
Figure 6B:
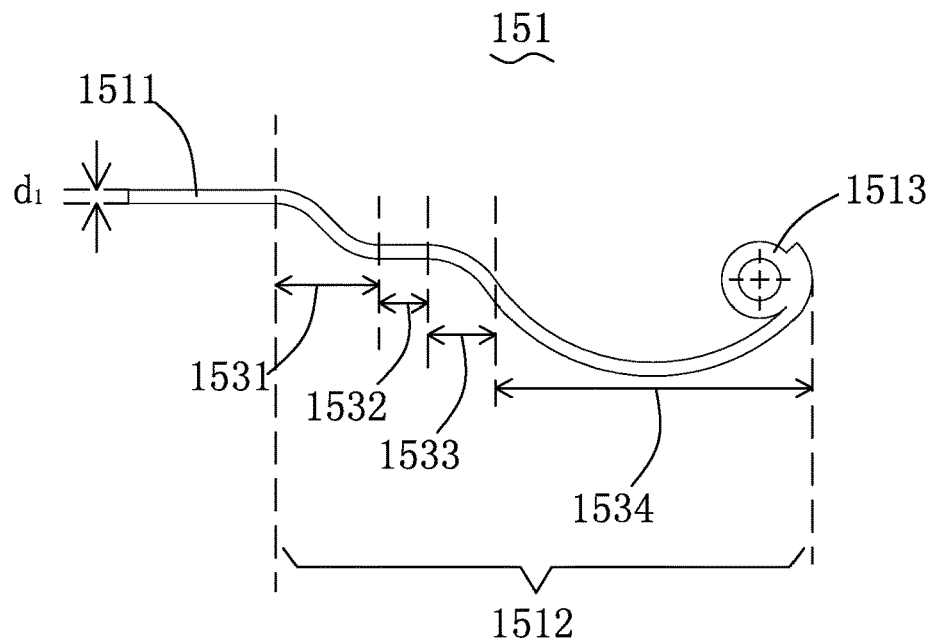
FIG. 6B is a side view showing the first damper member of the shock-absorbing assembly.

As shown in FIG. 6B, the first damper section 1512 includes a first transition portion 1531, a first buffer portion 1532, a second transition portion 1553 and a first damper portion 1534, which are smoothly connected together and integrally formed. The end of the first transition portion 1531 away from the first buffer portion 1532 is connected to the first positioning section 1511, and the end of the first damper portion 1534 away from the second transition portion 1553 is connected to the first connecting section 1513. The first buffer portion 1532 has a planar structure, and directly or indirectly coupled to the frame assembly 14. The first buffer portion 1532 can be connected to the frame assembly 14 to enhance the strength of the shock-absorbing assembly 15 and the frame assembly 14. The stress generated by the deformation of the first damper member 151 can be eliminated at the same time, thus prolonging the service life of the first damper member 151.

As the first buffer portion 1532 is provided, the connection between the first damper member 151 and the frame assembly 14 is reinforced. Moreover, the damage of the first damper member 151 is also avoided, which is caused by stress concentration arising from the direct connection between the first fixed section 1511 and the first shock absorber 1512. The first transition portion 1531 is disposed between the first positioning portion 1511 and the first buffer portion 1532, and it is curve shaped to avoid stress concentration and provides the function of vibration damping. The first connecting section 1513 is fixedly coupled to one end of the hub shaft 133 of the rear wheel assembly 13, and the first damper portion 1534 is beneficial to reduce the vibration of the vehicle.

Figure 6C:
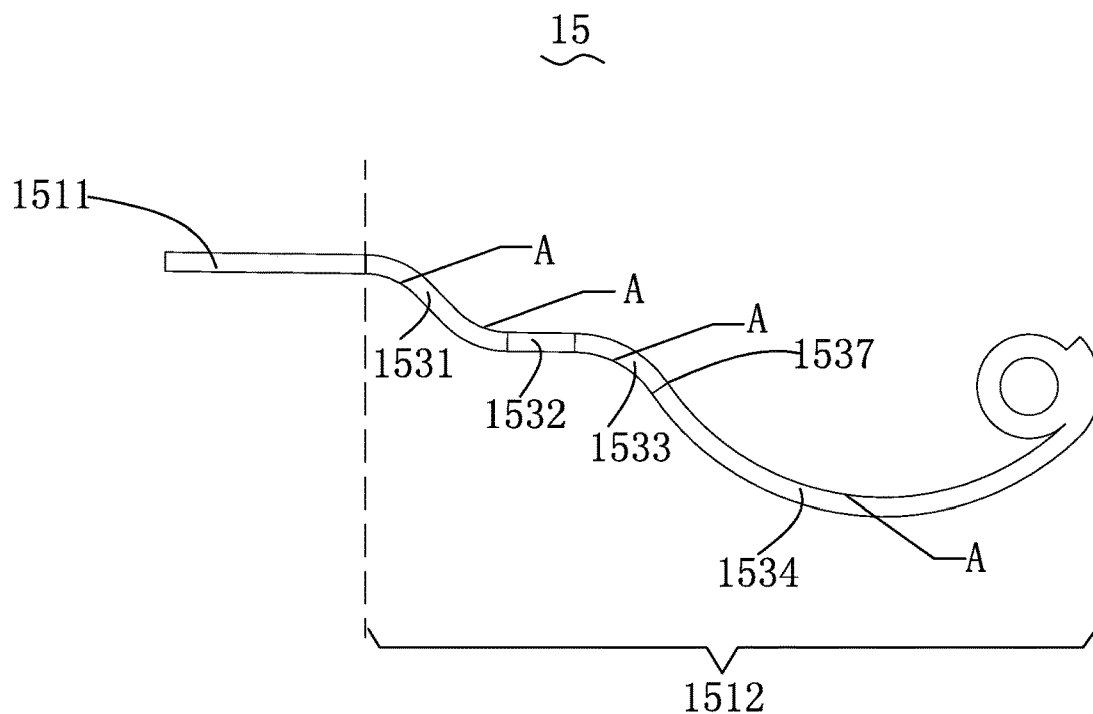
FIG. 6C is another side view showing first damper member of the shock-absorbing assembly.

Referring to FIG. 6C, the first damper portion 1534, the first transition portion 1531 and the second transition portion 1533 are wavy or curved, the tangent on the first transition portion 1531 and the horizontal line form an angle θ1 between 0° and 55° or between 0° and 45°, the second transition portion 1533 is curved, the tangent on the second transition portion 1533 and the horizontal line form an angle θ2 between 0° and 50° or between 0° and 45°, and the first damper portion 1534 is curved.

The first damper section 1512 is provided with at least three arched projections A, there are four arched projections as shown in FIG. 6, the openings of two adjacent arched projections A are different in direction, the opening direction of the arched protrusions A is defined as two directions, one is the horizontally upward direction and the other is the horizontally downward direction. The four arched projections A can be defined in the present disclosure, and the opening direction of the first arched projection A located between the first positioning section 1511 and the first transition portion 1531 is horizontally downward. The first damping section 1512 can be provided with at least 3 to 6 arched projections, and 3 to 5 protrusions.

Figure 6D:
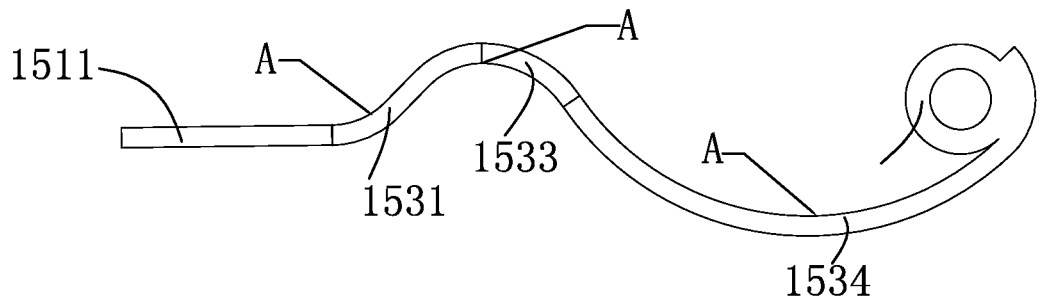
FIG. 6D is a perspective view showing an alternative shock-absorbing assembly of the scooter.

Referring to FIG. 6D, alternatively, the first buffer portion 1532 is omitted, and the first damper section 1512 is provided with three arched projections.

In the present embodiment, a turning point 1537 is defined at the junction between the second transition portion 1533 and the first damper portion 1534, so the second transition portion 1533 and the first damper portion 1534 is defined by the turning point 1537.

Figure 6E:
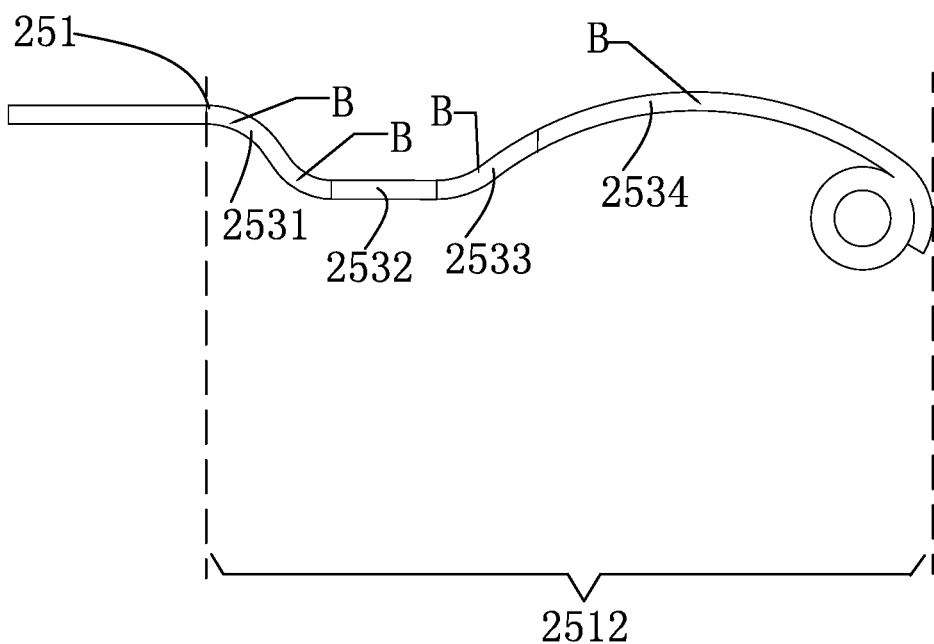
FIG. 6E is a perspective view showing another alternative shock-absorbing assembly of the scooter.

Referring to FIG. 6E, the present disclosure further provides another shock-absorbing assembly 25 as an alternative of the shock-absorbing assembly 15, and the shock-absorbing assembly 25 includes a first damper member 251 and a second damper member 255. The shock-absorbing assembly 25 differs from the shock-absorbing assembly 15 in that the first damper section 2512 and the second damper section 2552 (not shown) are different from the first damper section 1512 and the second damper section 1552. The first damper section 2512 is taken as an example, specifically, the first damper section 2512 is provided with at least four arched protrusions B, the openings of two adjacent arched protrusions B are facing the same direction, that is, the opening of two adjacent arched protrusions B are both horizontally directed upward or both horizontally directed downward, the opening directions of the arched protrusions B located on two ends of the first buffer portion 2532 can be the same, including but not limited thereto, and two adjacent arched protrusions B having the same opening direction may be also defined in the first transition portion 2531 or in the second transition portion 2533 as long as two adjacent arched protrusions B with the same opening directions of are in the first damper member 251. The opening directions of the arched protrusions B located on two ends of the first buffer portion 2532 can be horizontally directed upward, facilitating an elastic pad 135 to counteract the elastic force caused by the excessive amplitude of the shock-absorbing assembly 25. At the same time, the first damper portion 2534 is curved and the opening direction of the arched projection B thereof can be horizontally directed downward.

Figure 6F:
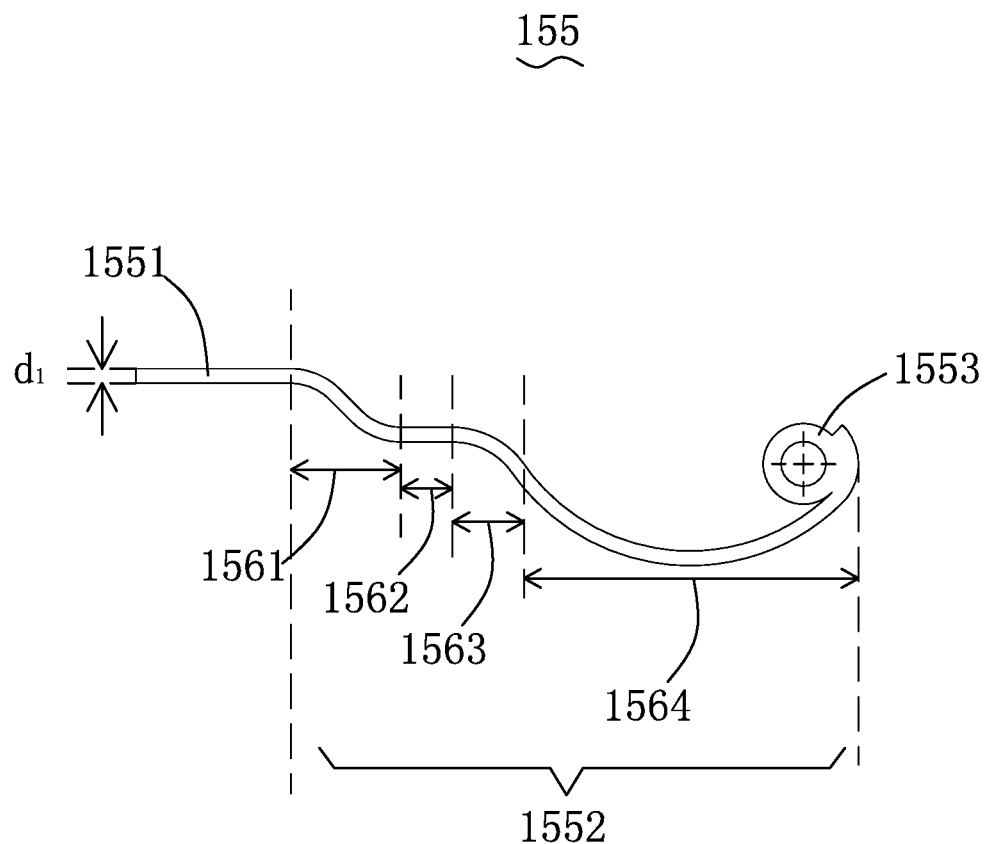
FIG. 6F is a side view showing the second damper member of the shock-absorbing assembly.

Referring to FIG. 6F, the second damper section 1552 includes a third transition portion 1561, a second buffer portion 1562, a fourth transition portion 1553 and a second damper portion 1564, which are smoothly connected together and integrally formed.

The end of the third transition portion 1561 away from the second buffer portion 1562 is connected to the second positioning section 1551, the end of the second damper portion 1564 away from the fourth transition portion 1563 is connected to the second connecting section 1553. The second buffer portion 1562 has a planar structure, the second buffer portion 1562 is directly or indirectly coupled to the frame assembly 14, the second buffer portion 1562 can be connected to the frame assembly 14 to enhance the strength of the shock-absorbing assembly 15 and the frame assembly 14, and the stress generated by the deformation of the second damper member 155 can be eliminated at the same time, thus the service life of the second damper member 155 is prolonged.

Figure 6G:
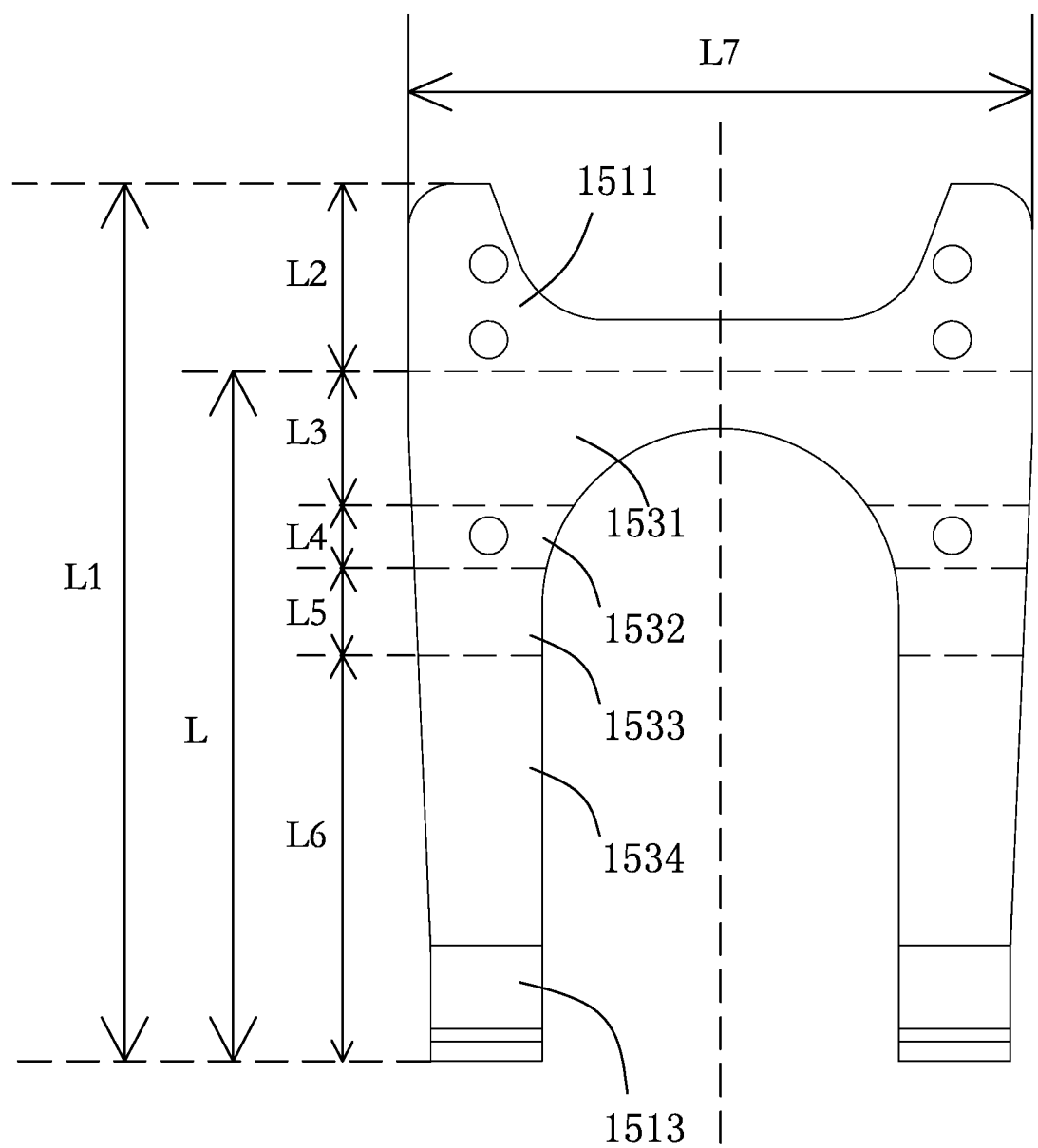
FIG. 6G is a top view of the shock-absorbing assembly.

Referring to FIG. 6G, the distance L7 from the first damper member 151 to the second damper member 155 gradually decreases from one end near the frame assembly 14 to one end of the rear wheel assembly 13, facilitating the assembly and disassembly of the shock-absorbing assembly 15, the frame assembly 14 and the rear wheel assembly 13. As the width of the first positioning section 1511 towards the first damper section 1512 becomes smaller, the elasticity of the shock-absorbing assembly 15 is increased, which is also beneficial for improving the vibration damping effect.

The length L1 of the shock-absorbing assembly 15 can be between 150 mm and 240 mm, between 160 mm and 220 mm, between 180 mm and 210 mm, or about 190 mm, 195 mm or 200 mm. The length of the first buffer portion 1532 is defined as L3, the length of the first positioning portion 1511 is defined as L2, the ratio of L3 to L2 can be 1:(2-6), the connection with the frame assembly 14 and the vibration damping effect are optimal when the ratio is 1:(2.5-5) or 1:(3-4), or the ratio of L3 to L2 is about 1:3. The length of the second transition portion 1533 is defined as L5, the length of the first transition portion 1511 is defined as L4, the ratio of L5 to L4 is 1:(1-3). The best stress relieving and vibration damping effect can occur when the ratio is 1:(1.2-2.3) or 1:(1.3-1.6), or the ratio of L5 to L4 is about 1:(1.6). The length of the first damper portion 1534 is defined as L6, and the ratio of L5 to L6 is 1(2.8-6). The best vibration damping effect can occur when the ratio is 1:(3.5-5.3) or 1:(4-4.8), or the ratio of L5 to L6 is about 1:4.7. The ratio of L5 to L4 to L6 is 1:(1-3):(2.8-6). The best stress relieving and vibration damping effect can occur when the ratio is 1:(1.2-2.3):(3.5-5.3) or 1:(1.3-1.6):(4-4.8), or if the ratio of L5 to L4 to L6 is about 1:(1.6):(4.7). The ratio of L3 to L4 to L5 to L6 can be 1:(2-3.5):(1.2-2):(5.5-7), or the ratio can be 1:(2-2.7):(1.3-1.8):(6-6.9). The length L of the first damper section 1512 refers to the shortest distance from one end of the first damper section 1512 to the other end in the direction from the first positioning section 1511 towards the first damper section 1512. The actual shortest extension length of the first damper section 1512 is defined as S, that is, the extended distance of the first damping section 1512 in the direction from the first positioning section 1511 towards the first damping section 1512, the ratio of L to S can be 1:(1.16-2), the ratio of L to S can be 1:(1.2-1.5), the length L2 of the first positioning section 1511 can be between 30 mm and 60 m, between 40 mm and 55 mm, between 40 mm and 45 mm, or L2 about 42.7 mm. The actual shortest extension length of the first damper portion 1534 equals (1.2-1.8)*L, or S equals (1.35-1.6)*L. Specifically, L can be between 145 mm and 170 mm, and S can be between 160 mm and 200 mm. Preferably, the actual shortest length of the first transition portion 1531 equals (1.2-1.4)*L3, and can be (1.25-1.35)*L3. The actual shortest length of the second transition portion 1533 can be (1.1-1.4)*L5, and can be (1.15-1.25)*L5.

The second damper member 155 and the first damper member 151 are axis-symmetric, that is, the first positioning section 1511 and the second positioning section 1551 are axis-symmetric, Similarly, the first damper member 251 and the second damper member 255 are axis-symmetric, the first damper section 1512 and the second damper section 1552 are axis-symmetric, and the first connecting section 1513 and the second connecting section 1553 are axis-symmetric. Therefore, the specific sizes and the structure of the second damper member 155 are referred to the first damper member 151, the specific sizes and the structure of the second damper member 255 are referred to the first damper member 251, and details are not described herein.

Figure 7:
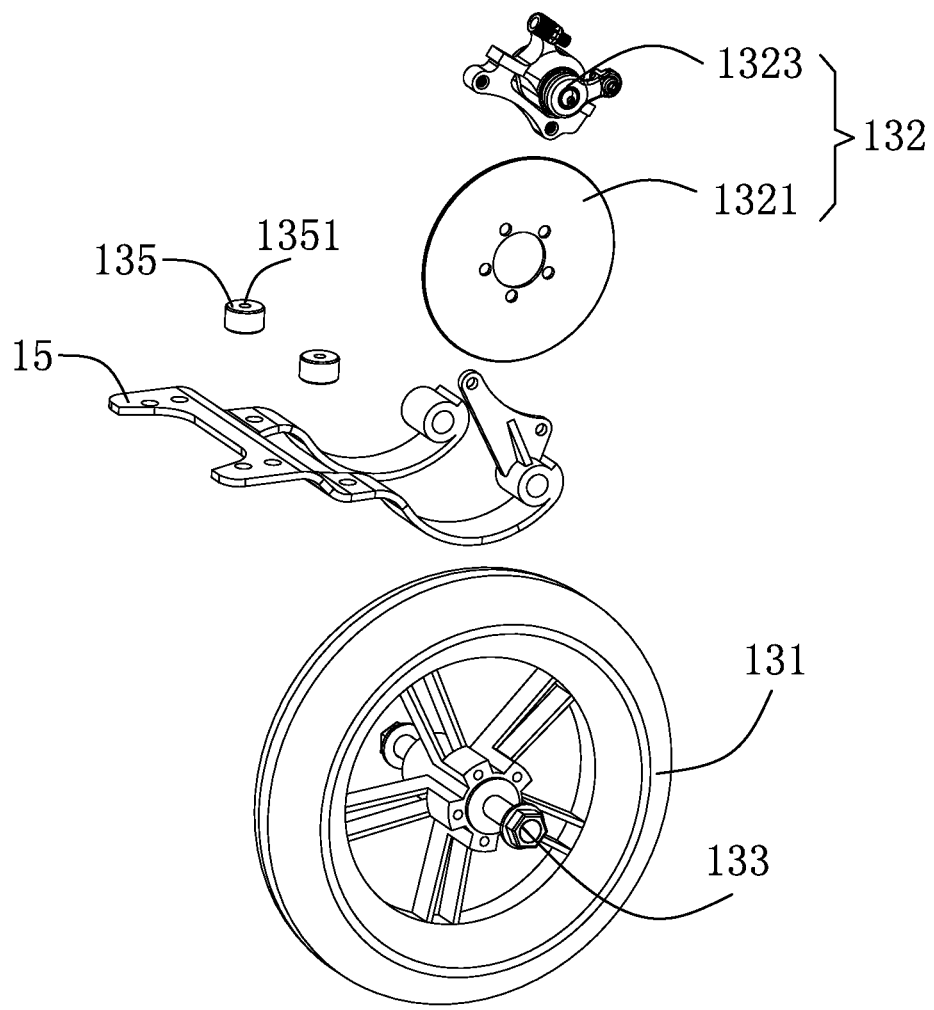
FIG. 7 is an exploded perspective view of an alternative rear wheel assembly of the scooter.

Referring to FIG. 7, in other embodiments, the rear wheel assembly 13 is provided with the elastic pad 135, and the elastic pad 135 is disposed between the first buffer portion 1532 and the frame assembly 14, and/or disposed between the second buffer portion 1562 and the frame assembly 14.

Specifically, the elastic pad 135 is provided with a through hole 1351, the elastic pad 135 is disposed between the frame assembly 14 and the first buffer portion 1532 and/or between the frame assembly 14 and the second buffer portion 1562, and is fixed to the frame assembly 14 by bolts. The radial dimension of the through hole 1351 of the elastic pad 135 is slightly larger than that of the bolt so that the elastic pad 135 can freely revolve around the bolt, the axial dimension of the elastic pad 135 is less than or equal to the distance from the first buffer portion 1532 to the frame assembly 14 when the scooter 10 stops, and the dimension of the elastic pad 135 is equal to the distance from the first buffer portion 1532 to the frame assembly 14. The elastic pad 135 is deformable to provide cushion. Preferably, the elastic pad 135 is made of casting polyurethane, that is to say, the elastic pad 135 acts as an excellent elastomer.

The elastic pad 135 abuts against the frame assembly 14 and deforms to offset the elastic force due to the excessive amplitude of the shock-absorbing assembly 15 to achieve the vibration damping effect.

The aforementioned shock-absorbing assembly 15 can also be applied to the wheels of other vehicles, reducing the vibration of other vehicles.

Figure 8A:
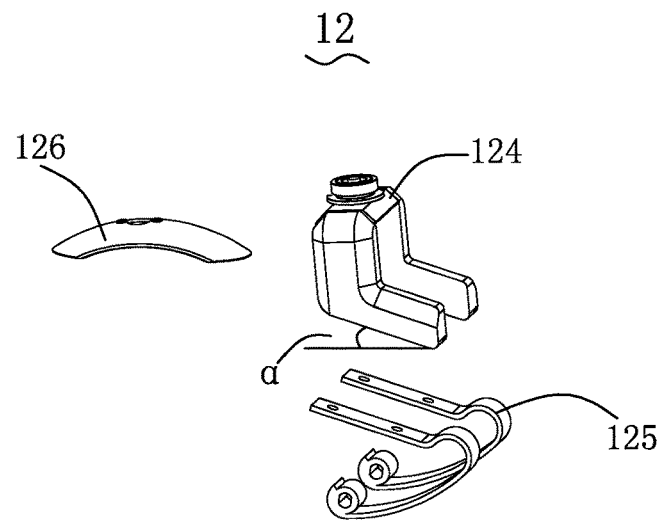
FIG. 8A is an exploded perspective view of the front wheel assembly of the scooter.
Figure 8A:
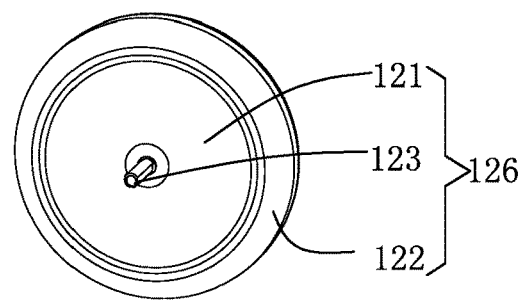
Figure 8B:
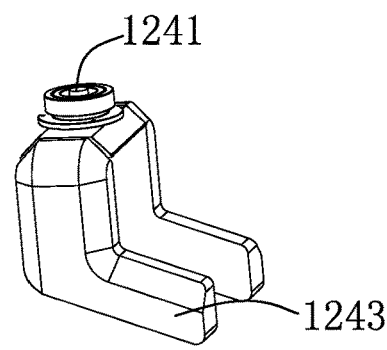
FIG. 8B is perspective view of the front fork of the scooter.

Referring to FIGS. 8A-8B, the front wheel assembly 12 includes a front wheel group 127, a front fork 124 and a shock-absorbing device 125. One end of the front fork 124 is coupled to the handle assembly 11 and rotatable relative to the frame assembly 14, and the shock-absorbing device 125 is disposed between the front fork 124 and the front wheel group 127 to alleviate vibrations generated by the front wheel group 127 during traveling.

Specifically, the front fork 124 includes a front fork shaft portion 1241 and a damper connecting portion 1243 coupled to the front fork shaft portion 1241. The damper connecting portion 1243 is configured to connect the shock-absorbing device 125 and the front fork shaft portion 1241, the front fork shaft 1241 is coupled to the third connecting portion 1163 and rotatable relative to the frame assembly 14, the front fork shaft 1241 is used for engaging the damper connecting portion 1243 and the handle assembly 11 so that the user can rotate the handle assembly 11 to drive the front fork 124 to rotate synchronously, thus the steering of the front wheel assembly 12 is realized.

Further, an angle α is formed between the horizontal plane and the mating surface of the damper connecting portion 1243 and the shock-absorbing device 125. Preferably, the angle α satisfies 0°≤α≤60° or 10°≤α≤45°, to reduce the impact force against the shock-absorbing device 125 when the scooter 10 is travelling.

The front wheel group 127 includes a hub motor 121, a front tire 122 and an axle 123. The axle 123 is also the shaft of the hub motor 121, the hub motor 121 is defined in the front tire 122, the hub motor 121 is electrically connecting with the control assembly 117, the hub motor 121 is controlled to spin around the axle 123 by the control assembly 117, and the hub motor 121 is an outer-rotor motor.

The shock-absorbing device 125 is disposed between the front fork 124 and the axle 123, for elastically connecting the front fork 124 and the rotating shaft 123. Thus, vibration damping can be achieved by elastic buffering if the front wheel assembly 12 is subjected to vibration during traveling.

Preferably, there are two shock-absorbing devices 125 respectively disposed on opposite sides of the axle 123 of the front wheel group 127 in the axial direction.

In some embodiments, the front wheel assembly 12 further includes a front fender 126, the front fender 126 is disposed between the front fork 124 and the front tire 122, and coupled to the front fork 124 to ward off the splatters generated by the front wheel assembly 12 when it is rolling.

In some embodiments, the front wheel assembly 12 is provided with no hub motor 121, and alternatively, the hub motor 121 is disposed on the rear wheel assembly 13, that is to say, the scooter 10 is driven by rear wheel.

Figure 9A:
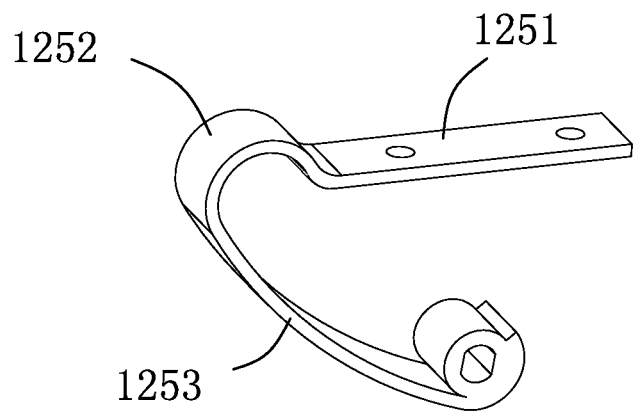
FIG. 9A is a perspective view of the shock-absorbing device.

Referring to FIG. 9A, the shock-absorbing device 125 includes a first damping sheet 1251, a second damping sheet 1253 and a stress sheet 1252. The first damping sheet 1251 is connected to the front fork 124, the second damping sheet 1253 is connected to the front wheel group 127, the stress sheet 1252 is disposed between the first damping sheet 1251 and the second damping 1253, and the stress concentration generated by the deformation of the first damping sheet 1251 and the second damping sheet 1253 can be eliminated, thus the service life of the shock-absorbing device 125 is prolonged.

In this embodiment, the first damping sheet 1251, the second damping sheet 1253, and the stress sheet 1252 are fixedly connected by welding, and alternatively, they are integrally formed. The first damping sheet 1251 and the second damping sheet 1253 and the stress sheet 1252 can be integrally formed.

Figure 9B:
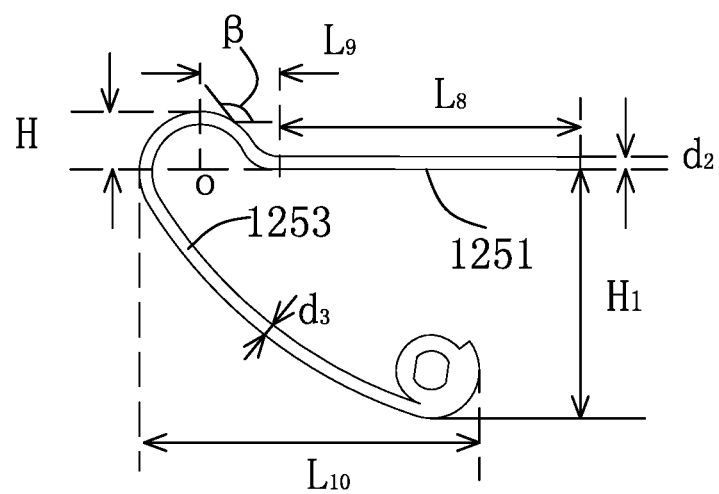
FIG. 9B is a perspective view of the shock-absorbing device viewed from a first direction.
Figure 9C:
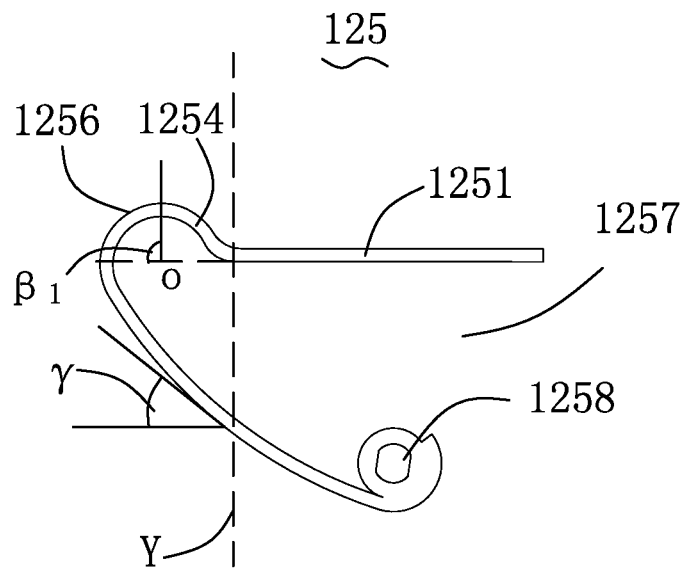
FIG. 9C is another perspective view of the shock-absorbing device viewed from the first direction.

Referring to FIGS. 9B and 9C, specifically, the first damping sheet 1251 having a length of L8 and a thickness of d2 is presented as sheet, L8 can be between 70 mm and 120 mm, and between 90 mm and 100 mm, and d2 can be between 3 mm and 6 mm, and between 4 mm and 5 mm.

The stress sheet 1252 is curved, including a first stress connecting portion 1254 and a second connecting portion 1256, the first stress connecting portion 1254 is connected to the first damping sheet 1251, and the second connecting portion 1256 is connected to the first stress connecting portion 1254 and the second damping sheet 1253.

Specifically, the direction perpendicular to the first damping sheet 1251 is defined as the first direction, two opposite sides of the shock-absorbing device 125 are defined by an axis formed on the junction of the first damping sheet 1251 and the stress sheet 1252, and the axis is parallel to the first direction. The direction of the first damping sheet 1251 is defined as a second direction, and the second direction is perpendicular to the first direction. One end of the first stress connecting portion 1254 is connected to the first damping sheet 1251, and the opposite end extends away from the first damping sheet 1251 and is connected to the second stress connecting portion 1256. A height difference is defined as H between a first junction where the first stress connecting portion 1254 and the first damping sheet 1251 meet and a second junction where the first stress connecting portion 1254 and the second stress connecting portion 1256 meet, H is between 12 mm and 18 mm, the projection length of the first stress connecting portion 1254 in the second direction is defined as L9, and L9 is between 12 mm and 18 mm.

Further, the first stress connecting portion 1254 is curved, the angle between the second direction and the tangent of the first stress connecting portion 1254 is β, and β satisfies 90°<β≤180°, 135°≤β≤180°, or 135°≤β≤180°.

The angle β is a gradient angle, that is, the angle β gradually increases from a connection end between the first stress connecting portion 1254 and the first damping sheet 1251 towards the connection end between the first stress connecting portion 1254 and the second stress connecting portion 1256.

The second stress connecting portion 1256 connects the first stress connecting portion 1254 and the second damping sheet 1253. The second stress connecting portion 1256 is curved, and has an arched segment, preferably, the central angle of the arched segment is defined as β1, β1 satisfies 90°<β1≤165°, or 100°≤β1≤135°.

The second damping sheet 1253 is a plate-shaped sheet or curve-shaped sheet, the thickness of that is defined as d3, the projection length in the second direction is defined as L10, L10 is between 70 mm and 120 mm, or between 90 mm and 100 mm, and d3 is between 3 mm and 6 mm, or between 4 mm and 5 mm.

Preferably, the second damping sheet 1253 is curve-shaped, the second damping sheet is curved and presented as a sheet, the angle between the second direction and the tangent direction of any point on the second damping sheet 1253 is defined as γ, and γ satisfies 25°<γ<90°.

The end of the second damping sheet 1253 is connected to the second stress connecting portion 1256, the other end is disposed on the same side as the end of the first damping sheet 1251 away from the stress sheet 1252 in the first direction, and the first direction is perpendicular to the second direction. A gap H1 is defined between the end of the second damping sheet 1253 away from the stress sheet 1252 and the end of the first damping sheet 1251 away from the stress sheet 1252, so that the shock-absorbing device 125 is formed with an opening 1257.

That is, in the first direction, two opposite sides are defined by an axis Y formed on the junction of the first damping sheet 1251 and the stress sheet 1252. In other words, there are two opposite sides of the first damping sheet 1251 in the first direction, one end of the second damping sheet 1253 away from the stress sheet 1252 and one end of the first damping sheet 1251 away from the stress sheet 1252 are disposed on the same side of the axis Y, the gap H1 is defined between the end of the second damping sheet 1253 away from the stress sheet 1252 and the end of the first damping sheet 1251 away from the stress sheet 1252, and the stress sheet 1252 is on the other side.

Alternatively, there are two opposite sides of the first damping sheet 1251 defined by the second direction, the stress sheet 1252 and the second damping sheet 1253 are respectively disposed on the opposite sides of the first damping sheet 1251, and the projection of the second damping sheet 1253 in the second direction is located on the first damping sheet 1251 (that is, the projection at least partially overlaps with the first damping sheet 1251). The gap H1 is defined between the end of the second damping sheet 1253 away from the stress sheet 1252 and the end of the first damping sheet 1251 away from the stress sheet 1252, thus the opening 1257 is formed.

The second damping sheet 1253 is provided with an axle connecting portion 1258, so that the second damping sheet 1253 is connected with the axle 123 via the axle connecting portion 1258. The axle connecting portion 1258 is disposed on the side of the second damping piece 1253 near the first damping sheet 1251.

The first stress connecting portion 1254 is connected to the first damping sheet 1251 and extends away from the first damping sheet 1251, the second stress connecting portion 1256 connects the first stress connecting portion 1254 and the second damping sheet 1253 and extends towards the first damping sheet 1251, so that the stress sheet 1252 is better supported, the second damping sheet 1253 is elastically deformed, and the shock-absorbing device 125 has better vibration damping effect and longer service life.

Further, the end of the second damping sheet 1253 away from the stress sheet 1252 is disposed on the same side as the end of the first damping sheet 1251 away from the stress sheet 1252 in the first direction, the gap H1 is defined between the bottom of the second damping sheet 1253 away from the stress sheet 1252 and the bottom of the first damping sheet 1251 away from the end of the stress sheet 1252, and thus the shock-absorbing device 125 is provided an opening 1257. Thereby the shock-absorbing device 125 is coupled between the front wheel group 127 and the front fork 124, the vibration generated by the front wheel group 127 is effectively alleviated during traveling, the stress is focused at the position of the stress piece 1252 when the first damping sheet 1251 and/or the second damping sheet 1253 are deformed, the stress is relieved by the curved bending of the stress sheet 1252, and the damage of the first damping sheet 1251 and the second damping sheet 1253 due to stress concentration when elastic deformation occurs is reduced.

Figure 9D:
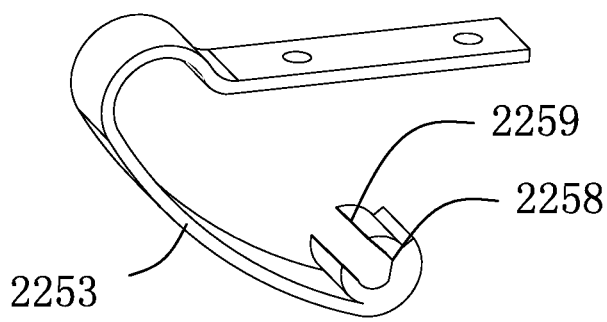
FIG. 9D is a perspective view of an alternative shock-absorbing device.

Referring to FIG. 9D, the disclosure provides an alternative shock-absorbing device 225, the hub connecting portion 2258 includes a notch 2259, the size of the cutout 2259 matches with that of the axle 123, and the notch 2259 facilitates the insertion of the axle 123 into the hub connecting portion 2258, so that the second damping sheet 2253 and the axle 123 are connected by the hub connecting portion 2258.

Figure 10:
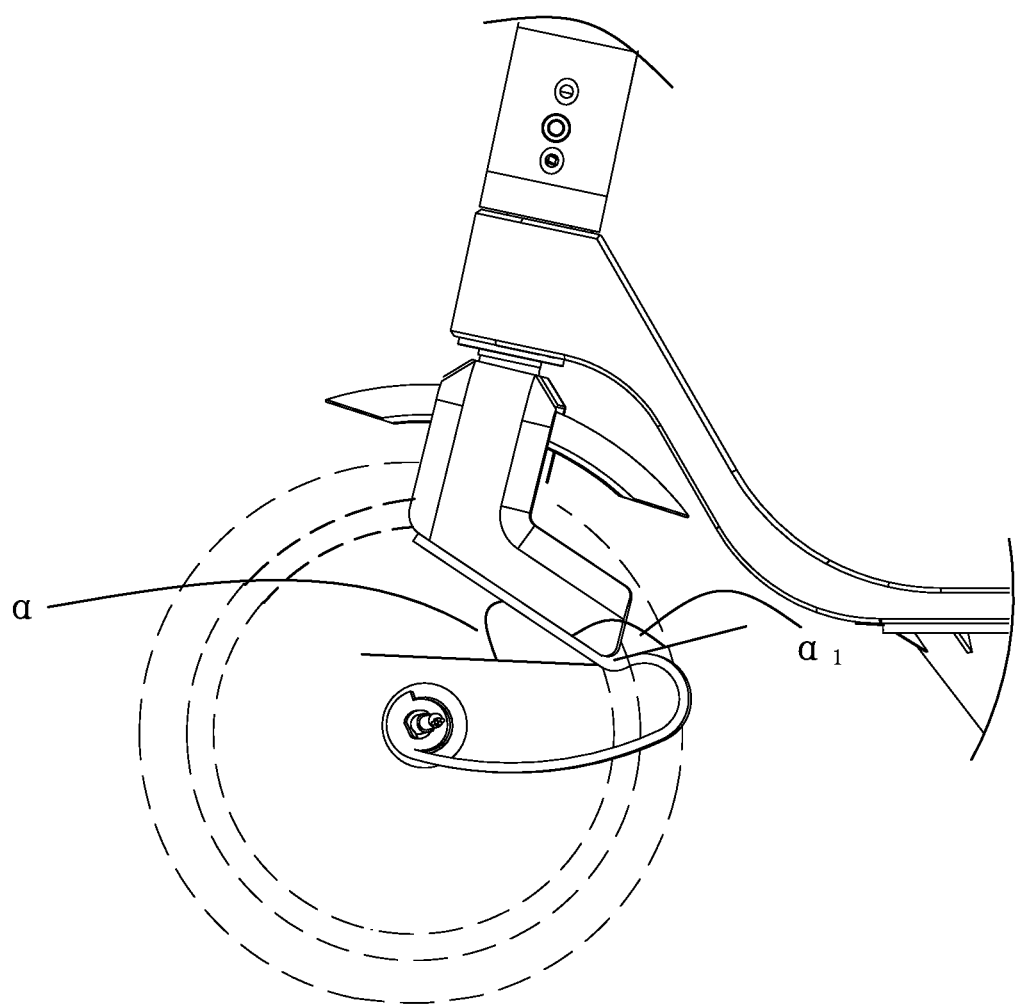
FIG. 10 is a partial structural view showing the shock-absorbing device coupled to the front wheel assembly.

Referring to FIG. 10, in some embodiments, when the shock-absorbing device 125 is coupled between the front wheel group 127 and the front fork 124, the contacting surface between the first damping sheet 1251 and the damper connecting portion 1243 of the front fork 124 forms an angle α with the horizontal plane, preferably, α satisfies $0° \leq \alpha \leq 60°$ or $10° \leq \alpha \leq 645°$, so that the scooter 10 can transfer the stress due to deformation to the stress sheet 1252 during traveling, and provide a better vibration damping effect.

Further, when the shock-absorbing device 125 is coupled between the front wheel group 127 and the front fork 124, the first stress connecting portion 1254 extends in the first direction away from the first damping sheet 1243. The tangent of any point on the first stress connecting portion 1254 forms an angle α1 with the contacting surface between the damper connecting portion 1243 and the first damping sheet 1251, a1 satisfies $90° \leq \alpha 1 \leq 135°$. Further, when the shock-absorbing device 125 is coupled between the front wheel group 127 and the front fork 124, the opening 1257 is back against the rear wheel assembly 13, the first damping sheet 1251 forms an angle α with the horizontal plane, α satisfies $0° \leq \alpha \leq 60°$ or $10° \leq \alpha \leq 45°$.

Figure 11:
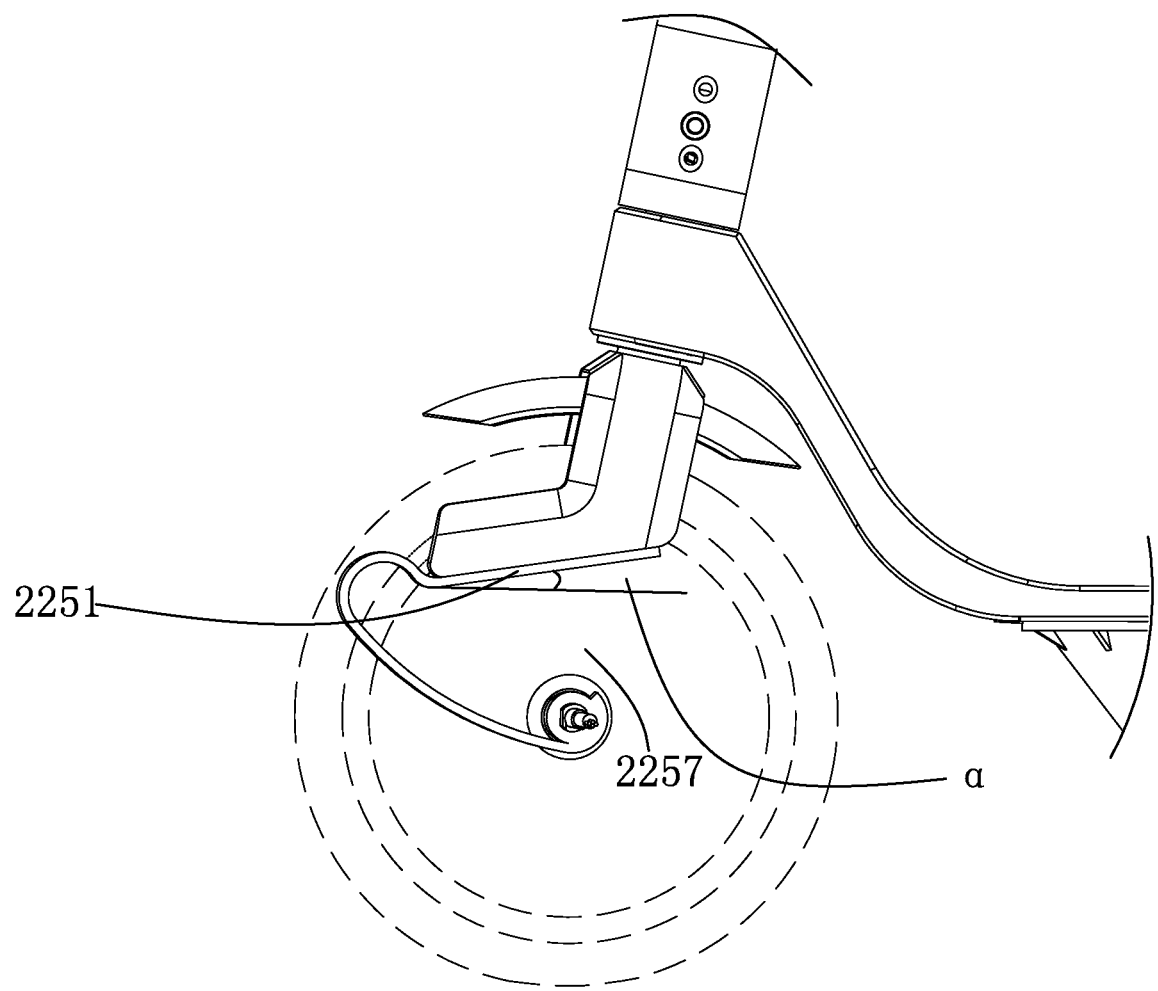
FIG. 11 is another partial structural view showing the shock-absorbing device coupled to the front wheel assembly.

Referring to FIG. 11, it is understood that an alternative opening 2257 is provided, the opening is facing the rear wheel assembly 13. The first damping sheet 2251 forms an angle α with the horizontal plane. Preferably, α satisfies $0° \leq \alpha \leq 60°$ or $10° \leq \alpha \leq 45°$.

It is also understood, the shock-absorbing device 125 is coupled between the frame assembly 14 and the front wheel assembly 127, that is to say, the shock-absorbing device 125 is fixedly connected with the frame assembly and rotatably connected with the front wheel group 127.

In some embodiments, the shock-absorbing device 125 is disposed between the frame assembly 14 and the rear wheel assembly 13 to reduce the vibrations generated by the frame assembly 14 and the rear wheel assembly 13.

It is also understood that the shock-absorbing device 125 and the shock-absorbing assembly 15 can also be applied to the wheels of other vehicles, reducing the vibration of other vehicles.

Additional advantages and modifications will readily occur to those skilled in the art. Therefore, the present disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle, comprising a front wheel assembly, a rear wheel assembly, a handle assembly connected to the front wheel assembly, a frame assembly having an end connected to the handle assembly and another end connected to the rear wheel assembly, a shock-absorbing device disposed on the front wheel assembly and/or a shock-absorbing assembly disposed on the rear wheel assembly to reduce the vibration of the vehicle, wherein the shock-absorbing device is disposed on the front wheel assembly, the front wheel assembly further includes a front fork and a front wheel group, the shock-absorbing device is coupled between the front fork and the front wheel group, the shock-absorbing device is formed with an opening, and the opening is facing or opposite to the rear wheel assembly after the shock-absorbing device is coupled between the front wheel assembly and the front fork;

the shock-absorbing device includes a first damping sheet, a second damping sheet and a stress sheet, the stress sheet is curved and located between the first damping sheet and the second damping sheet for connecting the first damping sheet and the second damping sheet; the direction perpendicular to the first damping sheet is defined as the first direction, two opposite sides of the shock-absorbing device are defined by an axis formed on the junction of the first damping sheet and the stress sheet, the axis is parallel to the first direction, the stress sheet is disposed on one side of the opposite sides, the end of the second damping sheet away from the stress sheet and the first damping sheet are disposed on the other side of the opposite sides, and a gap is defined between the end of the second damping sheet away from the stress sheet and the end of the first damping sheet away from the stress sheet, so that the opening is formed between the first damping sheet and the second damping sheet.

2. The vehicle as defined in claim 1, wherein the stress sheet includes a first stress connecting portion and a second stress connecting portion, the second stress connecting portion connects with the first stress connecting portion and the second damping sheet, the first stress connecting portion extends in the first direction away from the second damping sheet to connect the second stress connecting portion and the first damping sheet, and a height difference is defined between a first junction where the first stress connecting portion and the first damping sheet meet and a second junction where the first stress connecting portion and the second stress connecting portion meet.

3. The vehicle as defined in claim 2, wherein the direction of the first damping sheet is defined as a second direction, the second direction is perpendicular to the first direction, the angle between the second direction and the tangent of the first stress connecting portion is defined as β, β satisfies 90°<β≤180°, the second damping sheet is curved, the angle between the second direction and the tangent direction of any point on the second damping sheet is defined as γ, and γ satisfies 25°<γ<90°.

4. The vehicle as defined in claim 2, wherein the height difference is between 12 mm and 18 mm, the projection length of the first stress connecting portion in the second direction is between 12 mm and 18 mm, and the projection length of the second damping sheet in the second direction is between 70 mm and 120 mm.

5. The vehicle as defined in claim 1, wherein the front fork includes a front fork shaft portion and a damper connecting portion, the front fork shaft portion connects to the handle assembly, the angle between the horizontal plane and the contacting surface of the first damping sheet and the damper connecting portion is defined as a, and a satisfies 0°<α≤60°.

6. The vehicle as defined in claim 1, wherein the rear wheel assembly is provided with the shock-absorbing assembly, the shock-absorbing assembly includes a damper member, the damper member includes a positioning section, a damper section and a connecting section which are sequentially connected, the positioning section is connected to a frame, the connecting section is connected to a wheel assembly, a shortest distance from one end of the damper section to the other end is L, a shortest extension length of the damper section is S, and L to S is between 1:(1.16-2).

7. The vehicle as defined in claim 6, wherein the damper section includes a first transition portion, a buffer portion, a second transition portion and a damper portion, which are smoothly connected together and integrally formed, the end of the first transition portion away from the buffer portion is connected to the positioning section, the buffer portion is connected to the frame, the end of the damper section away from the second transition is connected to the connecting section, the first transition portion, the second transition portion, and the damper portion are wavy or curved, and the buffer portion has a planar structure.

8. The vehicle as defined in claim 7, wherein the damper section is provided with at least four arched projections, and the openings of two adjacent arched protrusions are facing a same direction.

9. The vehicle as defined in claim 8, wherein the arched projections located between two ends of the damper portion are facing a same direction.

10. The vehicle as defined in claim 7, wherein the length ratio of the buffer portion to the first transition portion to the second transition portion to the damper portion is 1:(2-3.5):(1.2-2):(5.5-7), the angle between the tangent of the first transition portion and the horizontal line is between 0° and 55°, and the angle between the tangent of the second transition portion and the horizontal line is between 0° and 50°.

11. The vehicle as defined in claim 7, wherein the length ratio of the buffer portion to the positioning portion is 1:(2-6), and the length ratio of the second transition portion to the first transition portion to the damper portion is 1:(1-3):(2.8-6).

12. The vehicle as defined in claim 6, wherein the damper section is provided with at least three arched projections, and the openings of two adjacent arched projections are different in direction.

13. The vehicle as defined in claim 1, wherein the vehicle is a scooter.

* * * * *